United States Patent [19]

Nakamura et al.

[11] 3,901,677

[45] Aug. 26, 1975

[54] METHOD FOR IMPROVING SOIL

[75] Inventors: Yoshiro Nakamura, Morioka; Akira Umehara, Osaka; Itsuyo Yamada, Kobe, all of Japan

[73] Assignee: Sankyo Kasei Company, Ltd., Japan

[22] Filed: June 18, 1974

[21] Appl. No.: 480,465

Related U.S. Application Data

[63] Continuation of Ser. No. 280,351, Aug. 14, 1972, abandoned.

[30] Foreign Application Priority Data

Aug. 20, 1971   Japan.............................. 46-63740

[52] U.S. Cl............................................... 71/64 SC
[51] Int. Cl.$^2$......................................... C05C 11/00

[58] Field of Search............................. 71/93, 64 SC

[56] References Cited
UNITED STATES PATENTS
2,996,505   8/1961   Schwarze........................ 71/93 X

*Primary Examiner*—Charles N. Hart
*Attorney, Agent, or Firm*—Toren, McGeady and Stanger

[57] ABSTRACT

A method for treating soil to fix a harmful metal contained therein which is characterized in that to soil containing a harmful metal ion is added at least one of mercapto-s-triazines and water-soluble salts thereof.

7 Claims, No Drawings

METHOD FOR IMPROVING SOIL

This is a continuation of application Ser. No. 280,351 filed Aug. 14, 1972, now abandoned.

This invention relates to a method for improving soil, more particularly to a method for treating soil containing harmful metals therein.

With the recent development of industries, harmful metal ions such as Cd, Hg, Pb, etc. discharged from the industries have gradually accumulated in the soil. In alkaline soil, such metal ions produce no problem since they are fixed in the soil in the form of stable hydroxides. In acidic or neutral soil, however, they are liable to be absorbed into plants and then to animals through the plants, resulting in death of the trees and various animal diseases.

Therefore, it is essential that the metal ions contaminating the soil be removed therefrom or fixed therein in a stable state. However, no successful method has been developed yet to accomplish this.

A main object of the invention is accordingly to provide a method for treating soil which makes it possible to fix harmful metal ions contained in acidic or neutral soil in a stable state, thereby rendering the metal unable to be ionized to avoid absorption by plants.

The method for treating soil is characterized in that to soil containing a harmful metal ion is added at least one of mercapto-s-triazines and water-soluble salts thereof, said mercapto-s-triazine having the formula,

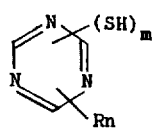

(I)

wherein R is hydrogen, $-NH_4$, $-OH$, alkyl having 1 to 8 carbon atoms, alkoxy having 1 to 8 carbon atoms, phenyl, cyclohexyl, oxazinyl, phenoxy, $-NR'_2$ or $SR''$, R' being hydrogen, alkyl having 1 to 8 carbon atoms, phenyl, cyclohexyl, naphthyl or benzyl, R'' being alkyl having 1 to 8 carbon atoms, phenyl, cyclohexyl, naphthyl or benzyl; $m$ is an integer of 1 to 3 and $n$ is 0 or an integer of 1 to 2.

The researchers of the present inventors revealed that when the above specific triazine derivative is added to soil, it reacts with a harmful metal ion contained in the soil to produce a stable compound which will never form metal ion nor be absorbed to plants. Thus the harmful metal ion is effectively fixed. Further, it has been found according to the researches of the present inventors that the above s-triazine derivatives have such a peculiar selectivity in that they react with metal ions having a normal electrode potential of at least $-0.440$ V (at 25°C) but not with metal ions having a lower normal electrode potential. According to the present invention, therefore, various harmful metal ions having a normal electrode potential not lower than $-0.440$ V (at 25°C) such as $Ag^+$, $Cd^{++}$, $Pb^{++}$, $Hg^{++}$, $Cu^{++}$, $Sn^{++}$, $Ni^{++}$, $Fe^{++}$ and $Fe^{+++}$ can be effectively fixed by the s-triazine derivatives of the invention, but metal ions which are essential to growth of plants and have lower normal electrode potential, such as $K^+$, $Ca^{++}$, $Mg^{++}$ remain in the soil as they are. Thus the soil is effectively improved.

The s-triazine derivatives used in the invention are a mercapto-s-triazine represented by the above formulas (I) and a water-soluble salt thereof, such as, an alkali metal salt, ammonium salt and alkaline earth metal salt. The mercapto-s-triazine includes a monomercapto-s-triazine, dimercapto-s-triazine and trimercapto-s-triazine. Of these the preferable salts are di- and tri-mercapto-s-triazines and water-soluble salts thereof. These compounds are stable and undergo no change when left to stand in the air for a long period of time. It is not required for the s-triazine derivatives to have a high solubity in water, provided that they will be dissolved in water in a minimum amount necessary for adsorbing metal ions in the water. The mono-, di- and tri-mercapto-s-triazines and the alkali metal, ammonium and alkaline earth metal salts thereof are usually dissolved in water in a concentration of 0.01 to 25 wt.% at 25°C, which is sufficient for the purpose.

Examples of the s-triazine derivatives are as follows:

A. Monomercapto-s-triazines and water-soluble salts thereof

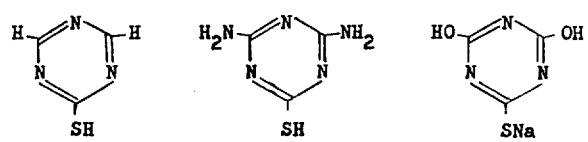

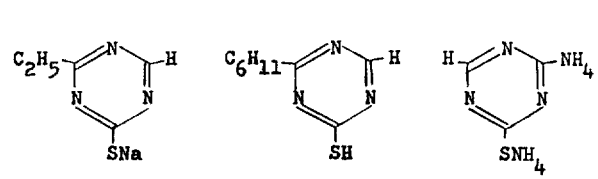

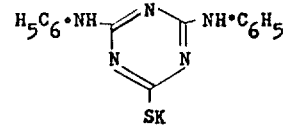

B. Dimercapto-s-triazines and water-soluble salts thereof:

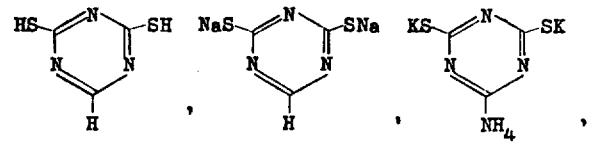

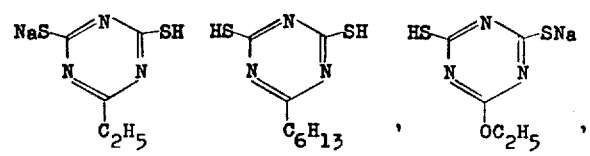

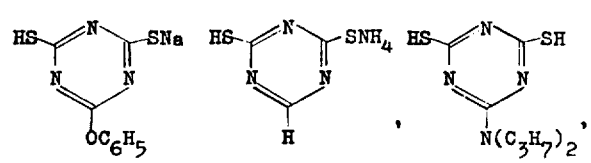

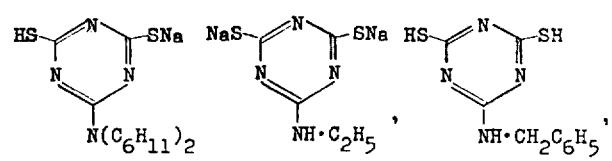

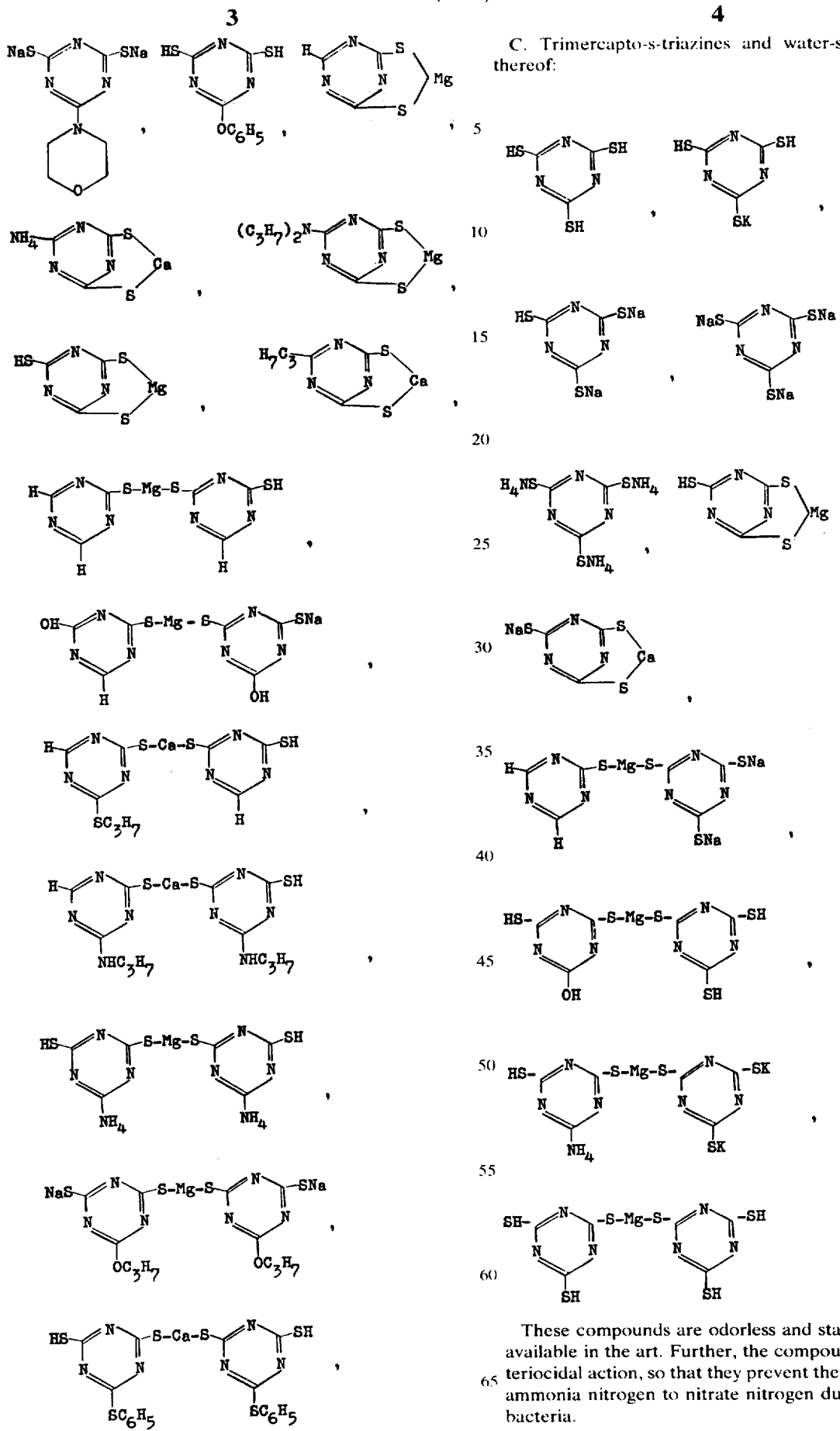
C. Trimercapto-s-triazines and water-soluble salts thereof:
These compounds are odorless and stable and easily available in the art. Further, the compounds have bacteriocidal action, so that they prevent the conversion of ammonia nitrogen to nitrate nitrogen due to action of bacteria.

The method of the invention is applicable to acidic or neutral soil containing at least one of metel ions having a normal electrode potential of at least −0.440 V (at 25°C). Particularly the present method is effective for acidic soil having a pH value of 4.0 to 6.5. The metal ions having a normal potential of at least −0.440 V (at 25°C) and to be fixed by the present invention include, for example, $Au^+$, $Ag^+$, $Cd^{++}$, $Pb^{++}$, $Hg^{++}$, $Cu^{++}$, $Sn^{++}$, $Ni^{++}$, $Fe^{++}$, $Fe^{+++}$, etc.

in amounts specified in Table 1 below. After being vigorously mixed in a barrel mixer for 60 minutes, the samples were washed with 500 ml of a 2% aqueous solution of citric acid for 60 minutes. The concentration of heavy metal ions in the solution was measured in accordance with the atomic absorption analysis disclosed in JIS 0102 – 1971 to determine the concentration of residual ions in the soil. The results are shown in Table 1 below.

Table 1

| | Soil sample | | | | Metal ion |
| Sample No. | Kind of metal ion | Metal ion concentration (p.p.m.) | pH | Amount of triazine compound (g) | concentration in soil (p.p.m.) |
| --- | --- | --- | --- | --- | --- |
| 1 | $Cd^{++}$ | 460 | 5.5 | 0.42 | 0.05 |
| 2 | $Pb^{++}$ | 150 | 6.0 | 0.07 | 0.1 |
| 3 | $Hg^{++}$ | 400 | 4.5 | 0.11 | 0.01 |
| 4 | $Cu^{++}$ | 100 | 4.0 | 0.12 | 0.1 |

The s-triazine derivatives of the invention can be applied to soil by various methods, for example, by sprinkling the compound in the form of an aqueous solution or dispersion, by sprinkling the compound with a fertilizer or by mixing the compound with soil in combination with powdery fillers, such as, lime, diatomace earth, etc. Of these methods, it is particularly preferable to apply the compound in the form of an aqueous solution or dispersion.

The amount of s-triazine derivatives to be used in the invention can vary over a wide range in accordance with the kinds of metal ions to be removed and triazine derivatives to be used. The triazine derivatives may usually be added to the soil in such an amount as to provide at least one mercapto group per valence of the metal ion. Excess amount of the s-triazine derivatives can be used without any adverse effect, since the compounds have substantially no toxicity and harmful effects on human being as well as on animals and plants. However, a largely excessive amount thereof gives no improved effect, so that it is preferable to use the compound in an amount less than 10 moles per valence of the metal ions. Particularly preferable amount is in the range of 1 to 3 moles per valence of the metal ions.

The metals fixed according to the present invention remain in a very stable form in the soil and never release metal ions.

For a better understanding of the invention examples are given below, in which p.p.m. and % are all by weight. Metal ion concentration in non-treated soil was determined as follows: to 10 g of a soil sample was added 50 ml of 0.1 N hydrochloric acid and the mixture was stirred at 30°C for 60 minutes. After the mixture was filtered, metal ion concentration in the filtrate was determined by atomic absoprtion analysis as disclosed in JIS 0102 – 1971.

EXAMPLE 1

100 g of air-dried soil samples having a diameter less than 2000 μ contaminated with various heavy metal ions were uniformly sprinkled with 30 ml of water and to the soil samples was added monosodium salt of 2,4,6-trimercapto-s-triazine trihydrate

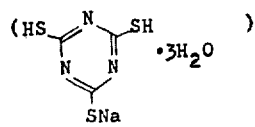

From Table 1 above, it is apparent that according to the present invention harmful heavy metal ions in the soil such as $Cd^{++}$, $Pb^{++}$, $Hg^{++}$, $Cu^{++}$ can be easily fixed in the soil in an insoluble state.

The soil samples treated in Example 1 were added to water and aqueous solutions of various acids and left to stand for 3 days, to determine stability of the insoluble products fixed in the soils by measuring metal ions dissolved in the water and solutions. The results are shown in Table 2.

Table 2

| Soil No. | 2% Aqueous solution of citric acid | Aqueous solution of nitric acid (pH 2) | Water |
| --- | --- | --- | --- |
| 1 | None | Trace | None |
| 2 | None | None | None |
| 3 | None | None | None |
| 4 | None | None | None |

From Table 2 above, it is apparent that heavy metals fixed in the soil according to the present invention as the insoluble products are very stable.

EXAMPLE 2

20 ml of a 0.1% aqueous solution of magnesium salt of 2,4,6-trimercapto-s-triazine (a mixture of

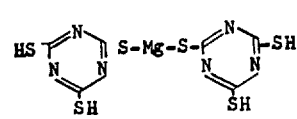

and

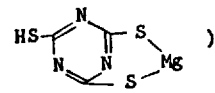

was sprinkled on 100 g of an air-dried soil of pH 5.0 having a diameter less than 2000 μ containing 6 p.p.m. of $Pb^{++}$ and 19 p.p.m. of $Cu^{++}$. After the soil was left to stand for 1 day, the concentration of residual metal ions in the soil was determined as in Example 1. The results are given in Table 3 below.

Table 3

| | Concentration of residual metal ion in the soil (p.p.m.) |
|---|---|
| $Pb^{++}$ | 0.1 |
| $Cu^{++}$ | 0.1 |

From Table 3 above, it is apparent that the present invention is effective for fixing heavy metal ions in soil.

EXAMPLE 3

20 ml of a 0.1% aqueous solution of monosodium salt of 2,4,6-trimercapto-s-triazine

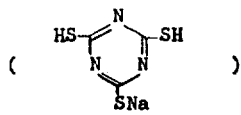

was sprinkled on 100 g of an air-dried soil sample having a diameter less than 2000 μ containing 50 p.p.m. of $Hg^{++}$ and 10 ml of water was further sprinkled thereon. After being left to stand for 1 day, the concentration of the residual $Hg^{++}$ in the soil was determined as in Example 1 with the result of less than 0.01 p.p.m. of $Hg^{++}$.

EXAMPLE 4

20 ml of a 0.05% aqueous solution of trisodium salt of 2,4,6-trimercapto-s-triazine

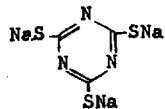

was sprinkled on 100 g of an air-dried soil sample having a diameter less than 2000 μ containing 20 p.p.m. of $Hg^{++}$. After being vigorously stirred in a barrel mixer for 60 minutes, 10 g of the soil was shaken with 50 ml of 0.1N hydrochloric acid and the concentration of residual $Hg^{++}$ in the soil was determined as in Example 1. The residual $Hg^{++}$ was less than 0.01 p.p.m.

What we claim is:

1. A method for treating soil to fix harmful metal ions having a normal electrode potential of at least -0.440 V at 25°C contained therein which is characterized in that to such soil is added at least one of mercapto-s-triazines and water-soluble salts thereof, said mercapto-s-triazine having a formula of

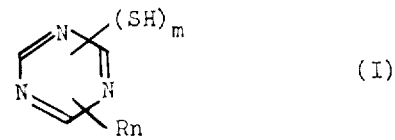

wherein R is hydrogen, $-NH_4$, $-OH$, alkyl having 1 to 8 carbon atoms, alkoxy having 1 to 8 carbon atoms, phenyl, cyclohexyl, oxazinyl, phenoxy, $-NR'_2$ or $SR''$, R', being hydrogen, alkyl having 1 to 8 carbon atoms, phenyl, cyclohexyl, naphthyl or benzyl, R" being alkyl having 1 to 8 carbon atoms, phenyl, cyclohexyl, naphthyl or benzyl; m is an integer of 1 to 3 and n is 0 or an integer of 1 to 2.

2. The method according to claim 1, in which said mercapto-s-triazine is a monomercapto-s-triazine.

3. The method according to claim 1, in which said mercapto-s-triazine is a dimercapto-s-triazine.

4. The method according to claim 1, in which said mercapto-s-triazine is a trimercapto-s-triazine.

5. The method according to claim 1, in which said water-soluble salt of mercapto-s-triazine is an alkali metal salt of mercapto-s-triazine, ammonium salt of mercapto-s-triazine or alkaline earth metal salt of mercapto-s-triazine.

6. The method according to claim 1, in which said water-soluble salt of mercapto-s-triazine is added to the soil in an amount of 1 to 3 moles per valence of the metal ion removed.

7. The method according to claim 1, in which said soil to be treated has a pH value of 4.0 to 6.5.

* * * * *